(12) United States Patent
Michiguchi et al.

(10) Patent No.: US 12,267,626 B2
(45) Date of Patent: Apr. 1, 2025

(54) PARKING SUPPORT APPARATUS, PARKING SUPPORT METHOD AND RECORDING MEDIUM

(71) Applicant: Panasonic Intellectual Property Management Co., Ltd., Osaka (JP)

(72) Inventors: Masayoshi Michiguchi, Kanagawa (JP); Yoshimasa Okabe, Kanagawa (JP); Takashi Okohira, Tokyo (JP); Jun Nakai, Kanagawa (JP); Takanobu Ito, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 174 days.

(21) Appl. No.: 18/133,820

(22) Filed: Apr. 12, 2023

(65) Prior Publication Data

US 2023/0254450 A1    Aug. 10, 2023

Related U.S. Application Data

(63) Continuation of application No. PCT/JP2021/032848, filed on Sep. 7, 2021.

(30) Foreign Application Priority Data

Oct. 23, 2020 (JP) .................... 2020-178176

(51) Int. Cl.
*H04N 7/18* (2006.01)
(52) U.S. Cl.
CPC ...................... *H04N 7/18* (2013.01)

(58) Field of Classification Search
CPC .......... H04N 7/18; H04N 7/181; B60R 99/00; B60W 30/06; B60W 50/10; B60W 50/14
See application file for complete search history.

(56) References Cited

U.S. PATENT DOCUMENTS

| 2014/0114529 A1* | 4/2014 | An ............................ B60R 1/27 701/36 |
| 2014/0139677 A1* | 5/2014 | Lambert ................ H04N 7/183 348/148 |

(Continued)

FOREIGN PATENT DOCUMENTS

| JP | 2019-43174 | 3/2019 |
| JP | 2019-51811 | 4/2019 |

OTHER PUBLICATIONS

International Search Report issued in International Pat. Appl. No. PCT/JP2021/032848, dated Oct. 12, 2021, along with an English translation thereof.

(Continued)

*Primary Examiner* — Timothy R Newlin
(74) *Attorney, Agent, or Firm* — Greenblum & Bernstein, P.L.C.

(57) ABSTRACT

A parking support apparatus includes a display control unit, a confirmation reception unit, and a parking control unit that performs a parking support control of a vehicle when a confirmation reception unit receives a parking region confirmation and a confirmation required region confirmation, and the confirmation reception unit simultaneously receives a single operation of the driver of the vehicle as the parking region confirmation and the confirmation required region confirmation.

10 Claims, 6 Drawing Sheets

(56) References Cited

U.S. PATENT DOCUMENTS

| | | | | |
|---|---|---|---|---|
| 2014/0350804 A1* | 11/2014 | Park | ............... | B60W 30/06 |
| | | | | 701/1 |
| 2016/0144858 A1* | 5/2016 | Burtsche | ............ | B62D 15/0285 |
| | | | | 701/23 |
| 2016/0203377 A1* | 7/2016 | Irie | ............... | H04N 23/90 |
| | | | | 348/118 |
| 2016/0207528 A1* | 7/2016 | Stefan | ............... | B60W 30/06 |
| 2016/0304087 A1* | 10/2016 | Noh | ............... | B60R 25/24 |
| 2017/0028985 A1* | 2/2017 | Kiyokawa | ............ | G01S 15/876 |
| 2017/0210377 A1* | 7/2017 | Bossdorf-Zimmer | ... | B60Q 3/16 |
| 2018/0037262 A1* | 2/2018 | Imai | ............ | G05D 1/0055 |
| 2018/0229720 A1* | 8/2018 | Benmimoun | ......... | B60W 50/14 |
| 2018/0257565 A1* | 9/2018 | Nogimori | ............ | G08G 1/0962 |
| 2018/0286240 A1* | 10/2018 | Harai | ............... | G08G 1/146 |
| 2019/0001968 A1* | 1/2019 | Yorifuji | ............... | B62D 15/027 |
| 2019/0071070 A1* | 3/2019 | Kato | ............... | B62D 15/0285 |
| 2019/0344828 A1* | 11/2019 | Omori | ............... | B60W 50/14 |
| 2019/0375381 A1* | 12/2019 | Nakagawa | ............ | B60W 10/20 |
| 2020/0001864 A1* | 1/2020 | Oyama | ............... | B60W 10/20 |
| 2020/0079359 A1* | 3/2020 | Tsujino | ............... | B60W 30/06 |
| 2020/0346638 A1* | 11/2020 | Benmimoun | ...... | B62D 15/0285 |
| 2021/0179079 A1* | 6/2021 | Hara | ............... | B60W 30/06 |
| 2022/0080956 A1* | 3/2022 | Seeland | ............ | B60W 30/06 |
| 2022/0332308 A1* | 10/2022 | Suzuki | ............... | B60K 35/22 |
| 2023/0254450 A1* | 8/2023 | Michiguchi | ............ | B60W 50/10 |

OTHER PUBLICATIONS

English translation of Office Action issued in Corresponding JP Patent Application No. 2020-178176, dated Nov. 7, 2023.

\* cited by examiner

PARKING SUPPORT APPARATUS, PARKING SUPPORT METHOD AND RECORDING MEDIUM

CLAIM FOR PRIORITY

This application is a Continuation of PCT/JP2021/032848 filed Sep. 7, 2021, and claims the priority benefit of Japanese application 2020-178176 filed Oct. 23, 2020, the contents of which are expressly incorporated by reference herein in their entireties.

TECHNICAL FIELD

The present disclosure relates to a parking support apparatus, a parking support method and a recording medium.

BACKGROUND ART

In the related art, a parking support apparatus for supporting the vehicle parking operation of the driver is known. For example, PTL 1 discloses a configuration for displaying the region where the vehicle does not enter in a visually recognizable manner on a display unit for the driver during the parking support.

In addition, a known parking support apparatus causes the driver to confirm the parking region to which the vehicle parks and the safety of the surroundings of the vehicle during the parking operation of the vehicle, and causes the driver to make an approval, for example.

CITATION LIST

Patent Literature

PTL 1
Japanese Patent Application Laid-Open No. 2019-51811

SUMMARY OF INVENTION

Technical Problem

Solution to Problem

A parking support apparatus according to an embodiment of the present disclosure includes: a processor configured to display on a display unit at least one of a parking region for parking a vehicle and a confirmation required region corresponding to the parking region. The processor receives a parking region confirmation for confirming the parking region and a confirmation required region confirmation for confirming the confirmation required region, performs a parking support control of the vehicle when the parking region confirmation and the confirmation required region confirmation are received, and simultaneously receives a single operation of a driver of the vehicle as the parking region confirmation and the confirmation required region confirmation.

A parking support method according to an embodiment of the present disclosure includes: displaying on a display unit at least one of a parking region for parking a vehicle and a confirmation required region corresponding to the parking region; and starting a parking support control when a single operation of a driver of the vehicle is simultaneously received as a parking region confirmation for confirming whether there is no problem in the parking region and a confirmation required region confirmation for confirming whether the confirmation required region is safe.

A computer-readable recording medium according to an embodiment of the present disclosure stores a parking support program for causing a computer to: display on a display unit at least one of a parking region for parking a vehicle and a confirmation required region corresponding to the parking region; and start a parking support control of the vehicle when a single operation of a driver of the vehicle is simultaneously received as a parking region confirmation for confirming whether there is no problem in the parking region and a confirmation required region confirmation for confirming whether the confirmation required region is safe.

Advantageous Effects of Invention

According to the present disclosure, the parking support operation can be simplified.

DESCRIPTION OF EMBODIMENTS

Embodiment 1

Figure 1:
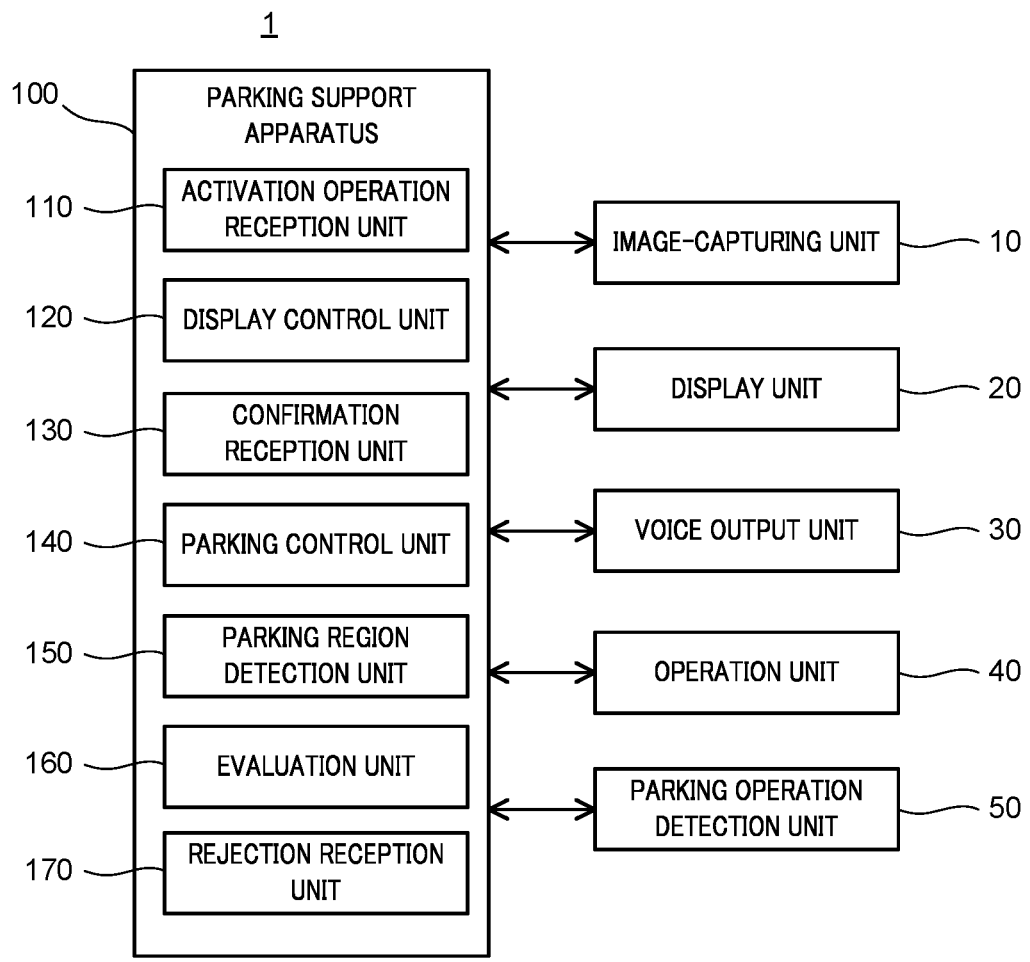
FIG. 1 is a diagram illustrating a vehicle including a parking support apparatus according to an embodiment of the present disclosure.

An embodiment of the present disclosure is described in detail below with reference to the drawings. FIG. 1 is a diagram illustrating vehicle 1 including parking support apparatus 100 according to an embodiment of the present disclosure.

As illustrated in FIG. 1, vehicle 1 has a parking support function that can support a parking operation of the driver. Vehicle 1 includes image-capturing unit 10, display unit 20, voice output unit 30, operation unit 40, parking operation detection unit 50, and parking support apparatus 100.

Image-capturing unit 10 is an in-vehicle camera including at least one of a front camera, a rear camera, and a side camera. Image-capturing unit 10 has a field angle of about 180 degrees, and is configured to capture the image of the surroundings of the vehicle, for example.

Display unit 20 is a display device that can be mounted near the driver's seat of vehicle 1, and may be configured to share the display portion with the car navigation system and the like, for example. Display unit 20 displays the image captured by image-capturing unit 10 (e.g., images illustrated in FIGS. 2B and 2C). Display unit 20 may be configured as a touch panel provided with a touch sensor on the surface so as to be function as an operation unit.

Voice output unit 30 is a speaker a that can output a voice, and outputs, to the driver of vehicle 1, a voice guide related to a control for supporting the parking (hereinafter referred to as "parking support control") based on parking support apparatus 100, for example. Voice output unit 30 may also be configured to share the speaker with the car audio system and the like.

Operation unit 40 is a switch, a button, and the like related to the parking and configured to be operated by the driver of vehicle 1 for the purpose of the parking. Operation unit 40 may be a button icon displayed on the touch panel screen of display unit 20, or may be a physical switch provided on the steering wheel or the like of vehicle 1.

Parking operation detection unit 50 is configured for detecting whether the driver has made an operation for the parking support control (hereinafter referred to as predetermined parking operation). The predetermined parking operation is an operation performed by the driver in accordance with the assistance of the parking support control. For example, in the case of a parking support method in which parking support apparatus 100 performs automatic steering as a part of a control for supporting the parking while an instruction of an operation of the accelerator, brake and gear is made for the driver through voice output unit 30 and display unit 20, and the operation of the parking is performed by the driver in accordance with the instruction, the operation of the accelerator, brake and gear is the predetermined parking operation. In addition, in the case where the automatic steering is performed, an instruction to release the steering wheel is made in advance for the driver, and therefore the operation of the driver releasing the steering wheel is also included in the predetermined parking operation. In the present embodiment, parking operation detection unit 50 is a sensor provided in the steering wheel, the pedals and/or the gear, and can detect whether the driver is operating the steering wheel, the pedals and/or the gear, for example. Note that parking operation detection unit 50 may be any sensor as long as whether the driver is operating the steering wheel, the pedals and/or the gear can be detected.

Parking support apparatus 100 also includes a central processing unit (CPU), a read only memory (ROM), a random access memory (RAM) and an input/output circuit not illustrated in the drawing. Parking support apparatus 100 executes the above-mentioned parking support control on the basis of a program set in advance.

Parking support apparatus 100 includes activation operation reception unit 110, display control unit 120, confirmation reception unit 130, parking control unit 140, parking region detection unit 150, evaluation unit 160, and rejection reception unit 170.

Activation operation reception unit 110 receives a signal indicating that an activation operation for activating parking support apparatus 100 is performed by the driver. For example, activation operation reception unit 110 is an automatic parking switch provided on the steering wheel or the like of vehicle 1, and the signal indicating that the activation operation is performed by the driver is a signal that is output when the automatic parking switch is short-pressed by the driver.

Specifically, activation operation reception unit 110 receives the instruction of the parking start for the parking support control by receiving a signal of the activation operation. Note that it is not preferable to receive the instruction of the parking start when vehicle 1 is travelling because the detection of the parking region and the like may not possibly be properly performed, and therefore it is necessary to receive the instruction of the parking start on the condition that the driver is applying the brake and vehicle 1 is being stopped. In the present example, the operation of releasing the steering wheel by the driver is received as confirmation, and therefore the fact that the driver is grabbing the steering wheel at the time point of the reception of the instruction of the parking start is added to the condition. In addition, the fact that the gear is neutral may be added although it is not applied in the present example.

In accordance with the instruction of the start of the parking of vehicle 1 (parking support control), display control unit 120 displays on display unit 20 the parking region where vehicle 1 can be parked and a confirmation required region corresponding to the parking region. Display control unit 120 determines, as an instruction of the parking start of vehicle 1, the fact that a signal indicating that the activation operation is performed by the driver is received by activation operation reception unit 110, and displays the parking region and the confirmation required region on display unit 20.

The parking region is a region detected by parking region detection unit 150 described later as the region where vehicle 1 can be parked from the image of the surroundings of vehicle 1 captured by image-capturing unit 10.

The confirmation required region is a region detected through the above-described parking support control from the image of the surroundings of vehicle 1 captured by image-capturing unit 10 as the region including the path through which the vehicle body will pass while vehicle 1 moves to the parking region.

The region including the path through which vehicle body will pass while vehicle 1 moves may be calculated by evaluation unit 160, or by a calculation unit not illustrated in the drawing.

Figure 2A:
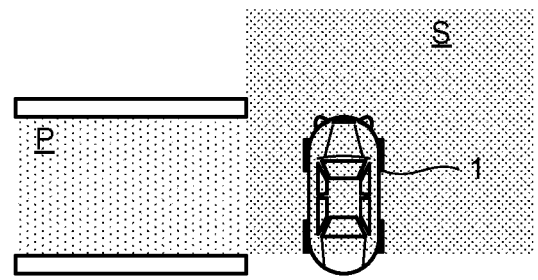
FIG. 2A is a diagram illustrating a positional relationship between a vehicle, a parking region and a confirmation required region.

For example, as illustrated in FIG. 2A, it is assumed that the driver of vehicle 1 attempts to park vehicle 1 in parking region P located on the left side of vehicle 1 with parking support apparatus 100.

Figure 2B:
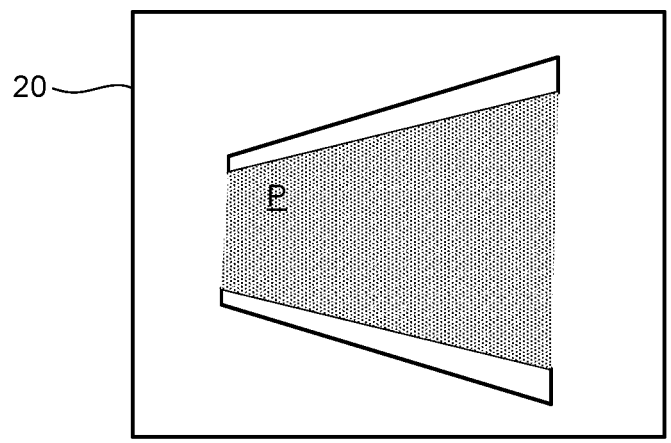
FIG. 2B is a diagram illustrating an example of a parking region displayed on a display unit.

In this case, display control unit 120 displays on display unit 20 the image of parking region P detected by parking region detection unit 150 on the basis of the image of the surroundings of vehicle 1 acquired by image-capturing unit 10 (see FIG. 2B).

Figure 2C:
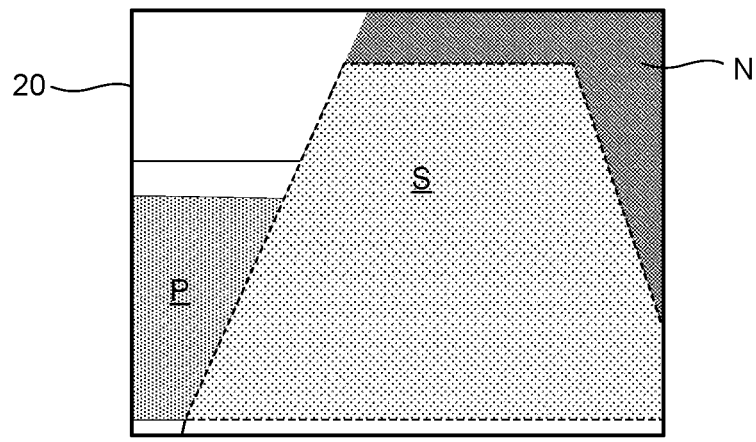
FIG. 2C is a diagram illustrating an example of a confirmation required region displayed on a display unit.

In addition, display control unit 120 displays on display unit 20 the image of the confirmation required region on the basis of the image of the surroundings of vehicle 1 acquired by image-capturing unit 10 (see FIG. 2C).

The region of symbol P in FIG. 2A is a parking region where vehicle 1 is to be parked. Since the parking region is a region where vehicle 1 enters, it is necessary not only to confirm the presence/absence of hindrance, but also to generally confirm there are no problems in consideration of allowing for getting in and out of the vehicle after parking, loading and unloading luggage, and the like.

The region of the reference symbol S is an interference region where vehicle 1 may possibly interfere with the hindrance in the process in which vehicle 1 moves to the parking region under the parking support control. The region of the reference symbol N in FIG. 2A is a non-interference region where there is no possibility of interfere of vehicle 1 with the hindrance in the process of vehicle 1 moving under the parking support control.

If there is hindrance in the interference region, it may possibly collide with vehicle 1, and therefore it is necessary to confirm the safety of the region before the start of travelling under the parking support control. Therefore, the interference region is referred to as the confirmation required region. The parking region is also required to be confirmed for the safety of the region before the start of travelling under the parking support control, but it is not included in the confirmation required region because the matters to be confirmed for the parking region are not limited to the confirmation of the safety. The position of the confirmation required region depends on the position of the parking region, and it is desirable that the confirmation required region be located adjacent to the parking region.

Note that display control unit 120 may display both the parking region and the confirmation required region on display unit 20, or display one of the parking region and the confirmation required region on display unit 20.

In addition, as illustrated in FIGS. 2B and 2C, display control unit 120 may display at least one of parking region P and confirmation required region S in an emphasized manner with hatching.

Note that while confirmation required region S and non-interference region N are illustrated with different hatchings in FIG. 2C, confirmation required region S and non-interference region N may be indicated with different colors such that confirmation required region S and non-interference region N can be distinguished.

Figure 3A:
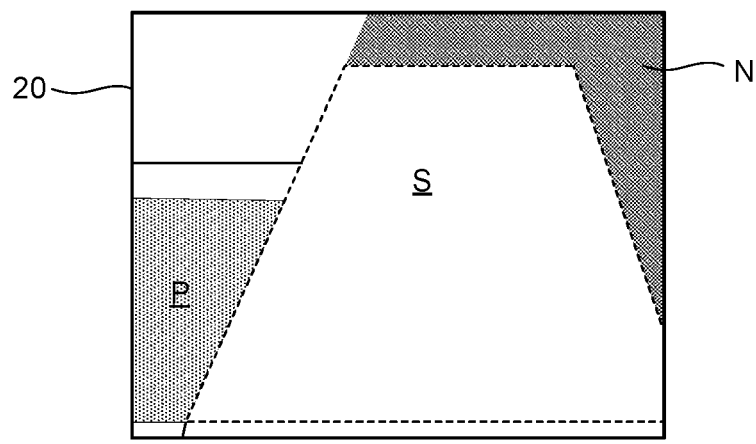
FIG. 3A is a diagram illustrating an example of a confirmation required region displayed on a display unit.

In addition, as illustrated in FIG. 3A, hatching or coloring may be added to non-interference region N for the purpose of reducing the visibility of non-interference region N. In this manner, the object in confirmation required region S can be easily identified in display unit 20. Alternatively, confirmation required region S may be displayed in an emphasized manner so that confirmation required region S can be recognized. In this manner, the range of confirmation required region S can be easily identified in display unit 20.

Figure 3B:
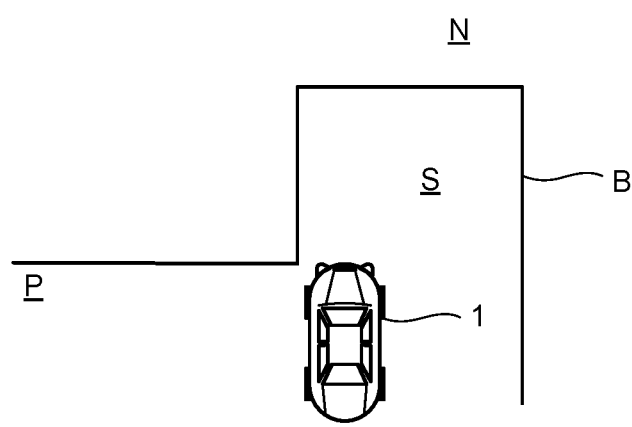
FIG. 3B is a diagram illustrating an example of a boundary line between a confirmation required region and a non-interference region.

In addition, as illustrated in FIG. 3B, boundary line B between confirmation required region S and non-interference region N may be displayed. Boundary line B illustrated in FIG. 3B also includes a boundary line between parking region P and non-interference region N.

Confirmation reception unit 130 receives a confirmation result indicating a confirmation that there is no problem in the parking region and a confirmation that the confirmation required region is safe through a single operation performed by the driver of the vehicle on the basis of the detection result of parking operation detection unit 50.

For example, when the detection signal of parking operation detection unit 50 is transferred from a state where the driver grabs the steering wheel to a state where the driver releases the steering wheel, confirmation reception unit 130 receives the above-mentioned confirmation result by receiving a signal indicating that the steering wheel is released from parking operation detection unit 50. Note that the steering wheel need not necessarily be completely released during the automatic steering, and the steering wheel may be lightly touched with hands as long as the steering wheel is not fixed or a force is applied to the steering wheel. That is, when the force applied to the steering wheel becomes smaller than a predetermined threshold value, it is possible to determine that the state is transferred from the state where the steering wheel is grabbed by the driver to the state where the steering wheel is released.

The operation by the driver is guided by voice output unit 30, for example. For example, after the parking region and the confirmation required region are displayed on display unit 20, voice output unit 30 makes a notification to the driver to confirm the position of the parking region and the safety of the confirmation required region. When the confirmations are completed, voice output unit 30 guides the driver to release the hands from operation unit 40.

Parking control unit 140 performs the parking support control of vehicle 1 when it determines a reception of a confirmation result indicating a confirmation that there is no problem in the parking region and a confirmation that the confirmation required region is safe.

Figure 4A:
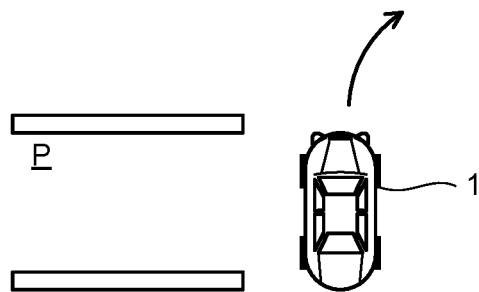
FIG. 4A is a diagram for describing a parking support control operation.

The parking support control of vehicle 1 is an automatic steering control of automatically performing the steering wheel operation of vehicle 1 during the parking operation, for example. For example, as illustrated in FIG. 4A, it is assumed that vehicle 1 is to be parked in parking region P on the left side of vehicle 1. In this case, parking control unit 140 controls the steering wheel operation such that vehicle 1 travels in an oblique right forward direction.

At this time, the driver sets the shift lever at the "D" position to release the brake pedal. This operation of the driver is guided by voice output unit 30, for example. As a result, vehicle 1 travels in an oblique right forward direction.

Figure 4B:
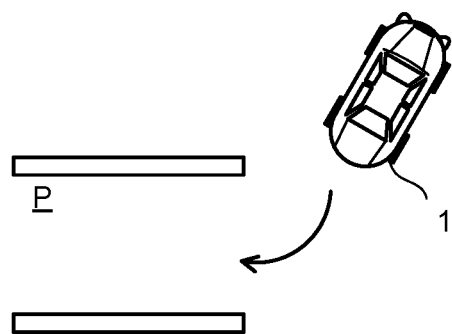
FIG. 4B is a diagram for describing the parking support control operation.

As illustrated in FIG. 4B, when vehicle 1 reaches a predetermined turning position, the driver applies the brake pedal to stop vehicle 1, and sets the shift lever to the "R" position to release the brake pedal again. This driver operation is guided by voice output unit 30, for example.

Figure 4C:
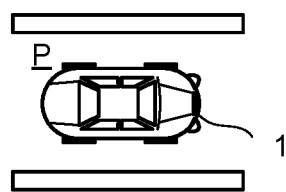
FIG. 4C is a diagram for describing the parking support control operation.

Then, parking control unit 140 controls the steering wheel operation such that vehicle 1 enters the parking space. In this manner, as illustrated in FIG. 4C, when vehicle 1 enters parking region P and the driver applies the brake pedal, the parking support control of vehicle 1 is completed. The above-described parking support control is merely an example, and other aspects may be adopted. For example, in the case of using a brake holding function in which once the driver applies the brake pedal, the brake is maintained even when the brake pedal is released, it is necessary to add an operation of applying the accelerator after the brake pedal is released. Conversely, in the case where the parking support control also performs an acceleration/deceleration control in addition to the automatic steering, it is necessary to add an instruction for not operating the accelerator and the brake.

Parking region detection unit 150 detects the candidate parking region in the region around vehicle 1 on the basis of the image of the surroundings of vehicle 1 captured by image-capturing unit 10. The parking region detection method may be a publicly known detection method.

In addition, when there is a plurality of candidate parking regions in the image of the surroundings of vehicle 1, parking region detection unit 150 detects the plurality candidate parking regions.

When a plurality of candidate parking regions is detected by parking region detection unit 150, evaluation unit 160 makes a candidate parking region list including the plurality of candidate parking regions, and sequentially makes respective evaluates.

In the case where there are candidate parking regions with different distances from vehicle 1 on the front and rear sides of vehicle 1, evaluation unit 160 makes the evaluation such that the smaller the distance of the candidate parking region in the front-rear direction, the higher the priority, for example. In addition, in the case where there is a plurality of candidate parking regions of which the distance from vehicle 1 in the front-rear direction is within a predetermined threshold value on the left or right side of the vehicle 1, evaluation unit 160 makes the evaluation such that the smaller the distance of the candidate parking region to vehicle 1 in the left-right direction, the higher the priority.

In addition, in the case where there is a plurality of candidate parking regions of which the distance from vehicle 1 in the left-right direction is within a predetermined threshold value, evaluation unit 160 makes the evaluation such that the priority of the candidate parking regions located on the left side of vehicle 1 is higher than the candidate parking regions located on the right side of vehicle 1, for example. In addition, evaluation unit 160 makes the evaluation so as to set the higher priority to the candidate parking regions located on the side (e.g., the right side) where vehicle 1 is more frequently parked on the basis of the past parking history, for example. In addition, evaluation unit 160 makes the evaluation by excluding the parking region rejected by the driver immediately before from the candidate parking region list In this manner, evaluation unit 160 determines an evaluation value for each of a plurality of candidate parking regions. The evaluation value is determined such that the higher the priority of the candidate parking region, the higher the value. Note that the evaluation method of evaluation unit 160 is not limited to the above-mentioned method, and any method may be adopted.

Then, in the case where there is a plurality of candidate parking regions in the image of the surroundings of vehicle 1, parking region detection unit 150 determines the parking region by selecting the candidate parking region with the highest evaluation value of evaluation unit 160 from among the plurality of candidate parking regions. Display control unit 120 displays on display unit 20 the parking region determined by parking region detection unit 150.

In this manner, even in the case where there is a plurality of candidate parking regions around vehicle 1, only one parking region that is easy to park can be displayed on display unit 20. The confirmation required region is determined depending on the parking region, and the confirmation required region is calculated as the region including the range where the vehicle body of vehicle 1 will pass when vehicle 1 moves from the stopping position of vehicle 1 to the parking region. The confirmation required region may be calculated by parking region detection unit 150, or may be calculated by a calculation unit not illustrated in the drawing.

Rejection reception unit 170 determines whether the driver has rejected the parking region. More specifically, when activation operation reception unit 110 receives the activation operation during the execution of the control of the parking support function, rejection reception unit 170 determines that the driver has rejected the parking region.

More specifically, when the driver rejects the parking region displayed on display unit 20, the driver presses the above-described automatic parking switch. Then, activation operation reception unit 110 receives a signal indicating that the automatic parking switch is pressed. That is, the same signal as the activation operation is received again during the execution the control of the parking support function of parking support apparatus 100.

As a result, rejection reception unit 170 determines that the driver has rejected a first parking region. Such an operation may be guided by voice output unit 30, or may be guided by displaying a message on display unit 20.

In the case where there is a plurality of candidate parking regions around vehicle 1, the driver may possibly desire to park vehicle 1 in a candidate parking region different from the displayed parking region (hereinafter referred to as first parking region) by visually sorting the candidate parking region. In this case, the driver may reject the first parking region displayed on display unit 20.

That is, in the present embodiment, with rejection reception unit 170, the parking to the parking region against the driver's will can be suppressed In the case where the driver has rejected the parking region, display control unit 120 excludes the rejected first parking region from the candidate parking region list such that the parking region is selected from among the remaining candidate parking regions, and as such display control unit 120 displays a parking region different from the rejected first parking region on display unit 20. In this manner, the display of the parking region can be quickly switched.

Incidentally, a skilled driver who has used the parking support function of parking support apparatus 100 according to the present embodiment multiple times can anticipate confirmation required region S and parking region P to be displayed in accordance with the stopped position before it is displayed on display unit 20, and therefore can preliminarily confirm whether there is no problem during the parking. In addition, the driver who has used the parking support function of parking support apparatus 100 according to the present embodiment multiple times knows in advance that releasing the hands from operation unit is a signal of the start of the operation of the parking support function, before the guide of voice output unit 30 and/or the display of a message on display unit 20 is made. As such, before the image of the surroundings of vehicle 1 is displayed on display unit 20, the driver may possibly voluntarily confirm the surroundings and perform the operation of releasing the hands from operation unit 40 as an operation indicating the confirmation.

For the purpose of evaluating the skill level of the driver, confirmation reception unit 130 of parking support apparatus 100 according to the present embodiment measures, as a confirmation time, the time difference between the time when parking region P and/or confirmation required region S is displayed on display unit 20 and the time when the confirmation is performed. This time measurement also covers a case where the time relationship is reversed, and in the case where the time when the confirmation is performed precedes the time when the parking region P and/or confirmation required region S is displayed on display unit 20, the measurement is performed with a value obtained by attaching a minus symbol to the time difference between the time when the confirmation is performed and the time of display, as a confirmation time. That is, in the case where the confirmation precedes the display, it is evaluated that the confirmation time from the display to the confirmation is a minus value.

In the present embodiment, when such a driver operation is performed, it is determined that an advanced confirmation (advance confirmation) has been made, whereas when a condition for allowing an advance confirmation is met, it is regarded as a confirmation that there is no problem in the parking region confirmation and a confirmation that the confirmation required region is safe, and, a reception control (acceptance of advance confirmation) is executed. That is, even when the parking region confirmation time from the display of the parking region to the confirmation of the parking region, or the confirmation required region confirmation time from the display of the confirmation required region to the confirmation required region confirmation is a minus value, confirmation reception unit 130 receives it as the parking region confirmation or the confirmation required region confirmation. Then, in the case where the parking region confirmation time or the confirmation required region confirmation time is a minus value, display control unit 120 changes the screen displaying the parking region or the confirmation required region from that of a case where the parking region confirmation time or the confirmation required region confirmation time is a plus value.

That is, in the case where the driver performs the predetermined parking operation before display control unit 120 performs the display on display unit 20, parking control unit 140 determines that a confirmation result indicating a confirmation that there is no problem in the parking region and a confirmation that the confirmation required region is safe is received.

Then, after the path calculation from the present position of vehicle 1 to the parking region or the like is performed and the parking region or the like is displayed on display unit 20, parking control unit 140 starts the parking support control. Normally, when the parking region or the like is displayed on display unit 20, a message requesting the parking region confirmation and the safety confirmation of the confirmation required region is notified with texts and voice; however, in the case where the confirmation is preliminarily performed, it is desirable to change the content of the message in accordance with the confirmation operation. For example, in the case where the confirmation has been already made, it is not necessary to request the confirmation, and therefore a message that indicates that the confirmation has been received, such as "confirmation that there is no problem in parking region, etc. received and automatic parking will be started", is made, for example.

In this manner, the advance confirmation can further reduce the driver's confirmation time before the start of the parking support control. In addition, in the case where the advance confirmation is not made, the parking support control is started in accordance with the confirmation, whereas in the case where an advance confirmation is made, there is a time difference between the confirmation and the start of the parking support control. During this period from the confirmation to the start of the parking support control, it is possible to cause voice output unit 30 to make a guidance to make the driver to apply the brake pedal, or it is possible to brake vehicle 1 by activating the brake holding function. That is, at the time when the operation indicating confirmation is received, vehicle 1 is being stopped and the braking can be continued until the start of the parking support control, and therefore, vehicle 1 is safe even when the advance confirmation is performed.

Note that in the case where the above-mentioned evaluation unit 160 makes the evaluation for a plurality of candidate parking regions, the criterion evaluation of the candidate parking regions of evaluation unit 160 is created according to the criterion regarded as suitable for the parking by the driver, but they do not always match. As such, in the case where the difference in evaluation value between the selected first parking region and a candidate parking region with a second evaluation value (hereinafter referred to as second parking region) is small, the parking region displayed on display unit 20 (the above-mentioned first parking region) and the parking region estimated to be a region to be parked by the driver may not possibly coincide with each other.

In this case, if the above-mentioned confirmation result is received before the first parking region is displayed on display unit 20, it may possibly be regarded as a fact that parking support apparatus 100 has received the confirmation even when the driver has not made the parking region confirmation for the first confirmation required region.

In view of this, parking control unit 140 determines a presence/absence of the second parking region having an evaluation value of which the difference from the evaluation value of the first parking region is equal to or smaller than the predetermined threshold value, and performs the parking support control in accordance with the determination result. More specifically, when the difference between the evaluation value of the first parking region and the evaluation value of the second parking region is equal to or smaller than the predetermined threshold value, parking control unit 140 determines that the condition for accepting the advance confirmation is not met, and discards the operation even when the driver performs the predetermined parking operation, and, does not start the parking support control.

In other words, in the case where the difference between the evaluation value of the candidate parking region having the first highest evaluation value and the evaluation value of the candidate parking region having the second highest evaluation value is smaller than the predetermined threshold value among a plurality of candidate parking regions detected by parking region detection unit 150 and provided with the evaluation values by evaluation unit 160, confirmation reception unit 130 prohibits the reception of the confirmation result as the parking region confirmation or the confirmation required region confirmation when the parking region confirmation time or the confirmation required region confirmation time is a minus value. Note that in this case, it is favorable to use voice output unit 30 and display unit 20 to make a guidance to perform the predetermined parking operation again by confirming the parking region and the confirmation required region displayed on display unit 20.

In the case where the difference between the evaluation value of the first parking region and the evaluation value of the second parking region is equal to or smaller than the predetermined threshold value as described above, parking control unit 140 starts the parking support control when the parking region and the confirmation required region are displayed on display unit 20 and then the predetermined parking operation is performed by the driver.

In this manner, the mismatch between the parking region recognized by parking support apparatus 100 and the parking region recognized by the driver can be prevented.

In addition, in the present embodiment, the one-step confirmation method is described in which the confirmation that there is no problem in the parking region and the confirmation that the confirmation required region is safe are indicated by the driver through a single operation, and when it is received by confirmation reception unit 130, parking control unit 140 starts the parking support control. This confirmation method is suitable for a skilled driver, who can remember most of the message provided by parking support apparatus 100 and can perform the parking region confirmation and the confirmation required region confirmation at the same time, and this method may be referred to as an expert mode.

However, in some situation the driver unfamiliar with the parking support function of parking support apparatus 100 according to the present embodiment may more easily understand a two-step confirmation method in which the driver performs a single operation at the time when it is confirmed that there is no problem in the parking region, and the driver subsequently performs another single operation at the time when it is confirmed that the confirmation required region is safe, and, parking control unit 140 starts the parking support control when the two confirmation operations are received by confirmation reception unit 130. This mode of separately performing the parking region confirmation and the confirmation required region confirmation is suitable for a non-skilled driver, and may be referred to as non-expert mode.

In view of this, confirmation reception unit 130 may cause parking control unit 140 to start the parking support control by selecting one of a control of starting the parking support when the above-mentioned two confirmations are performed in a single operation and a control of starting the parking support when the above-mentioned two confirmations are separately performed. That is, confirmation reception unit 130 may select the non-expert mode and the expert mode. However, if a non-skilled driver selects the expert mode without preparation, the driver may possibly start the parking support control based on insufficient confirmation without understanding that there is a plurality of regions to confirm.

In view of this, the initial setting of vehicle 1 at shipment is the non-expert mode, and at the time when the skill level of the driver about the use of parking support apparatus 100 is determined to be greater than a threshold value, the use of the expert mode may be proposed to the driver so as to switch the control by detecting a voluntary operation of the control selection button by the driver and the like. The skill level evaluation and the mode selection should be performed for each driver, and the skill level evaluation and the mode selection may be switched in accordance with the driver by discriminating the driver by referring to the image of the driver, identifying the key ID owned by the driver, making a determination based on the weight applied to the driver's seat, and the like. There are various conceivable means for evaluating the skill level, and, as a simple means, the skill level may be evaluated in accordance with the number of times parking support apparatus 100 is used.

However, the learning speed varies from person to person, and older people tend to learn more slowly. That is, even when the number of times parking support apparatus 100 is used exceeds a predetermined number of times, a certain skill level may not possibly be achieved. In view of this, it is possible to determine, as a skill level determination reference time, any of the parking region confirmation time from the display of the parking region to the confirmation of the parking region or the confirmation required region confirmation time from the display of the confirmation required region to the confirmation required region confirmation, or, a total confirmation time obtained by summing up the parking region confirmation time and the confirmation required region confirmation time so as to determine that the driver has a certain skill level at the time when the skill level determination reference time becomes smaller than the predetermined value.

The confirmation time increases when the confirmation is performed after viewing the parking region and the confirmation required region, but the confirmation time decreases when the confirmation is performed by predicting the parking region and the confirmation required region, and finally the advance confirmation prior to the display of the parking region and the confirmation required region will be made. In the case where such an advance confirmation is made, a minus time measurement value is used as the time measurement value. That is, a value obtained by adding a minus symbol to the time difference between the time of confirmation and the time of display of the parking region and the confirmation required region is used as the measurement value of the confirmation time. Then, when the average value of the time measurement values of the past several uses of parking support apparatus 100 becomes smaller than a predetermined threshold value, it is determined that the driver achieves a certain skill level. In this case, in the case where the driver is notified of the availability of the expert mode and the driver has selected the expert mode, the confirmation will be thereafter received as the expert mode for this driver.

Figure 5:
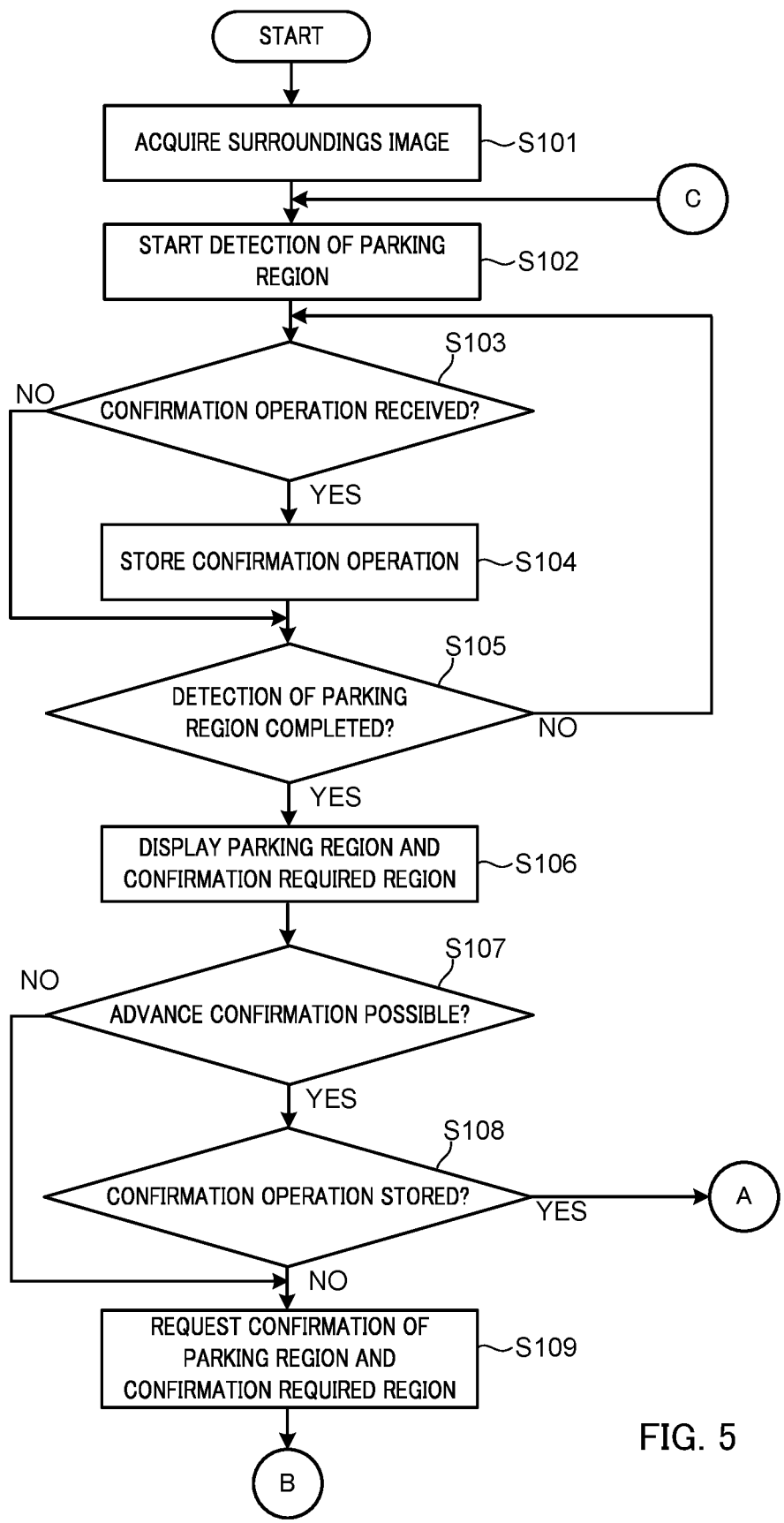
FIG. 5 is a flowchart illustrating an exemplary operation of a parking support control in the parking support apparatus.
Figure 6:
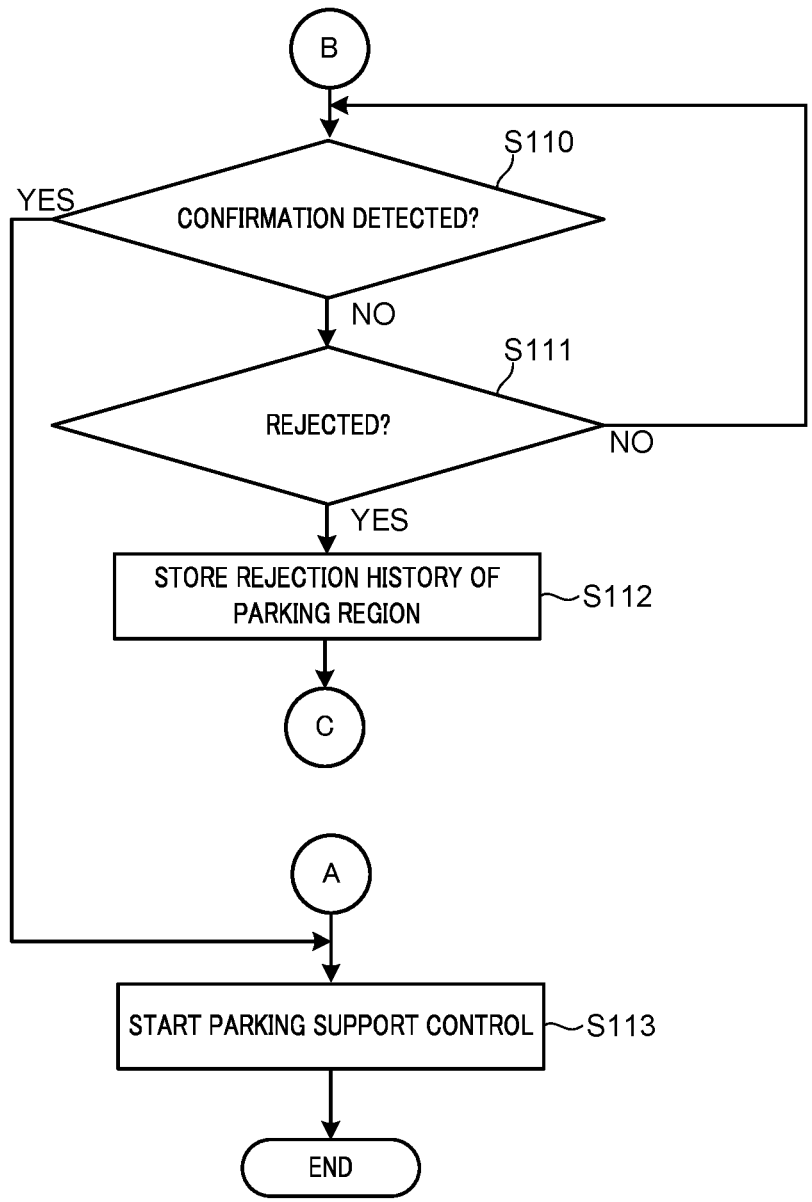
FIG. 6 is a flowchart illustrating an exemplary operation of a parking support control in the parking support apparatus.

Next, an example of the parking support control of parking support apparatus 100 with the above-mentioned configuration is described. FIGS. 5 and 6 are flowcharts illustrating an example of the parking support control of parking support apparatus 100. The process illustrated in FIGS. 5 and 6 are executed as necessary when the driver activates parking support apparatus 100 and a signal indicating that the activation operation has been performed is received by reception unit 110, for example.

As illustrated in FIG. 5, parking support apparatus 100 acquires an image of the surroundings of vehicle 1 (step S101). Next, parking support apparatus 100 starts the parking region detection (step S102). Specifically, parking region detection unit 150 detects the candidate parking region on the basis of the acquired image of the surroundings, and subsequently evaluation unit 160 evaluates the candidate parking region, and, parking region detection unit 150 selects the parking region in accordance with the evaluation. At this time, when there is a recorded history of rejection of a parking region, the parking region is selected by adding the rejection history to the parking region evaluation condition. Further, the range of the confirmation required region is specified in accordance with the selected parking region. Here, the process from the detection of the parking region to the identification of the confirmation required region is representatively referred to as detection of the parking region.

During the period of the detection of the parking region, confirmation reception unit 130 determines whether the confirmation operation has been received (step S103). The confirmation operation received by confirmation reception unit 130 may be a predetermined switch operation of operation unit 40 or a predetermined parking operation that is performed by the driver and detected by parking operation detection unit 50.

Here, as described above, the predetermined parking operation is a predetermined operation performed by the driver such as releasing the hands from the steering wheel. The parking operation performed at this timing is an operation performed by a skilled driver, who has used the parking support function multiple times, by voluntarily confirming the safety of the confirmation required region while estimating the parking region and the safe confirmation required range before the image of the surroundings of vehicle 1 is displayed on display unit 20. In addition, as described above, the confirmation operation may be a switch operation, and therefore it is possible to determine that the confirmation operation has been received when one of the predetermined parking operation and predetermined switch operation is performed.

When it is determined that a predetermined confirmation operation has been received (step S103, YES), the process proceeds to step S104, and parking support apparatus 100 stores the fact that the confirmation operation has been made (step S104). On the other hand, when it is determined that the predetermined confirmation operation has not been received (step S103, NO), step S104 is skipped, in each case, the process proceeds to step S105.

At step S105, parking support apparatus 100 determines whether the parking region detection has been completed, and when it is not completed (step S105, NO) the process returns to step S103 to repeat the process. When the parking region detection has been completed (step S105, YES), the process proceeds to step S106. At step S106, parking support apparatus 100 displays the parking region and the confirmation required region, and the process proceeds to step S107.

As described above, the detection of the parking region includes the parking region selection and the candidate parking region evaluation performed by evaluation unit 160, and when the selected parking region is referred to as the first parking region, evaluation unit 160 determines whether there is a candidate parking region having an evaluation value close to that of the first parking region. That is, parking support apparatus 100 determines whether the advance confirmation can be made (step S107).

When it is determined that there is no candidate parking region having an evaluation value close to that of the first parking region, and the advance confirmation can be made (step S107, YES), the advance confirmation is allowed, and the process proceeds to step S108. Step S108 is a step for allowing the advance confirmation. When parking support apparatus 100 stores a fact that a confirmation operation has been made (step S108, YES), the process proceeds to step S113 such that parking support apparatus 100 starts the parking support control (see FIG. 6), whereas when there is no confirmation operation (step S108, NO), the process proceeds to step S109.

On the other hand, at step S107, in the case where there is a candidate parking region having an evaluation value close to that of the first parking region, and the advance confirmation cannot be made (step S107, NO), the advance confirmation is not allowed, and therefore the process skips step S108 and proceeds to the process proceeds to step S109. At step S109, parking support apparatus 100 provides a notification requesting the driver to confirm the confirmation required region and the parking region (the first parking region) displayed on display unit 20. As the means of the notification, it is desirable to use both the means of displaying texts on display unit 20 and the means of outputting a voice requesting the confirmation using voice output unit 30. Step S109 unconditionally proceeds to step S110.

As illustrated in FIG. 6, at step S110, parking support apparatus 100 determines whether a confirmation operation has been detected (step S110). If a confirmation operation is detected after the parking region and the confirmation required region are displayed, then that detected operation is not an advance confirmation regardless of whether the advance confirmation has been allowed. When a confirmation operation is detected (step S110, YES), the process proceeds to step S113, and parking support apparatus 100 starts the parking support control. When no confirmation operation is detected (step S110, NO), the process proceeds to step S111, and parking support apparatus 100 determines whether a rejection has been made (step S111).

At step S111, when rejection reception unit 170 determines that a rejection has been made (step S111, YES), the first parking region displayed on display unit 20 is rejected, and the process proceeds to step S112. Then, parking support apparatus 100 stores a rejection history indicating the rejection of the first parking region, and the process is returned to step S102 again (see FIG. 5) to perform the process of detecting the parking region. In this case, evaluation unit 160 performs the reevaluation with reference to the rejection history indicating the rejection of the first parking region, and therefore the candidate parking region with the highest evaluation value (the second parking region) is selected from among the candidate parking regions excluding the rejected first parking region.

At step S111, when rejection reception unit 170 does not determine that a rejection has been made (step S111, NO), the process proceeds to step S110 and repeats the process. Since step S110 is the reception of confirmation, the reception of confirmation and the reception of rejection are repeated.

Rejection reception unit 170 may determine that a rejection has been received when a state where there is no predetermined parking operation and there is no confirmation determination is continued for a predetermined time. As described above, the predetermined parking operation is a predetermined operation performed by the driver in the parking support control such as releasing the hands from the steering wheel.

When it is determined that a rejection has been received because the predetermined parking operation is not made for the predetermined time (step S111, YES), the parking region displayed on display unit 20 is rejected, and the process returns to step S102 to perform the process of displaying on display unit 20 the parking region with the second highest evaluation value after the rejected parking region.

In addition, an active rejection operation by the driver may be received. For example, when a signal indicating that the activation operation is performed is received by activation operation reception unit 110, that is, when the activation operation is performed during the execution of confirmation, it may be interpreted as an instruction of starting over and may be determined to be a reception of rejection. Further, as another means, a rejection may be received by an operation of a button indicating a rejection in operation unit 40, and a rejection may be determined to be received when the parking operation detection unit detects a strong application of the brake pedal. Although not illustrated in the drawing, the active rejection operation by the driver can be received in each step, and the driver can perform the activation again at any time. For example, when the driver releases the hand from the steering wheel for other reasons, confirmation reception unit 130 may possibly receive it as confirmation. However, since the vehicle is not travelling at the time point of the confirmation, the instruction of starting over can be made when it is against the intention by performing an active rejection operation such as strong application of the brake pedal.

On the other hand, in the case where the predetermined parking operation has been made and the fact that a confirmation operation has been made is stored (step S108, YES) or a confirmation operation has been detected (step S110, YES), parking support apparatus 100 starts the parking support control (step S113). After step S113, the parking support control is executed, and this control is completed.

Note that in the case of "YES" at step S108, that is, in the case where an advance confirmation is performed, the movement of vehicle 1 is started at the timing of the completion of the parking region detection, not the timing of the confirmation operation performed, and therefore the start of the movement of vehicle 1 may possibly be a surprise for the driver. In view of this, when starting the parking support control, vehicle 1 may be moved after making a notification of the start of movement of vehicle 1 in advance, or a step of notifying the start of movement may be inserted only when an advance confirmation is performed.

According to the present embodiment with the above-mentioned configurations, the parking support control is performed when a confirmation result indicating a confirmation that there is no problem in the parking region and a confirmation that the confirmation required region is safe is received through a single operation by the driver of the vehicle.

In the case where two confirmations are separately received, the driver performs the operation two times, and a time lag of the reception of the two confirmations occurs. Therefore, it takes time until the parking support apparatus starts the parking support control.

In view of this, in the present embodiment, parking support apparatus 100 can acquire information about the results of the two confirmations through a single operation of the driver of the vehicle, and thus the time from the activation of parking support apparatus 100 to the start of the parking support control can be reduced.

That is, in the present embodiment, the entire parking support control can be simplified. In particular, when the driver is accustomed to the parking support control of parking support apparatus 100, the driver can anticipate the range that should be confirmed in both the parking region and the confirmation required region, and thus the parking support control according to the present disclosure becomes more efficient.

In addition, in the above description, an operation of releasing the hands from driver operation unit 40 is performed as a predetermined operation one time to notify parking support apparatus 100 of the fact that the driver has made the parking region confirmation and the safety confirmation of the confirmation required region. In this manner, the operation of the driver for the parking support control can be simplified.

In addition, in the case where the driver performs the predetermined parking operation before display control unit 120 performs the display on display unit 20, the time of the operation of the driver for the parking support control can be further reduced by allowing for the advance confirmation in which parking control unit 140 determines that the results of the two confirmations have been received.

In addition, in the case where there is a plurality of parking regions in the image of the surroundings of vehicle 1, each of the plurality of parking regions is evaluated to determine the first parking region with the highest evaluation value, and thus the optimum parking region can be presented to the driver.

In addition, in the case where there is the second parking region with the evaluation value close to that of the first parking region, the parking support control is not started in the above-mentioned advance confirmation, and thus it is possible to prevent the start of the parking support control when the parking region recognized by parking support apparatus 100 and the parking region recognized by the driver do not match.

In addition, while the predetermined parking operation is the operation of releasing the hands from the steering wheel (operation unit 40), i.e., the operation of releasing the steering wheel in the present embodiment, the present disclosure is not limited to this.

For example, the predetermined parking operation may be an operation of releasing the brake pedal of vehicle 1. When the operation of releasing the brake pedal of vehicle 1 is performed, the parking support control is started assuming that two confirmations have been performed.

In addition, the predetermined parking operation may be an operation of a shift change of vehicle 1. For example, when parking support apparatus 100 is activated with vehicle 1 shifted at "N" and shift change to "D" is performed, the parking support control may be started assuming that two confirmations have been performed.

Further, the predetermined parking operation may be other operations such as an operation of the accelerator pedal. When such an operation is performed, the parking support control is started assuming that two confirmations have been performed.

Embodiment 2

Note that while the advance confirmation is allowed in the above-described Embodiment 1, the present disclosure is not limited to this, and the advance confirmation may not be allowed. Specifically, steps S103, S105, S107 and S108 in FIG. 5 may not be performed.

In this case, only the confirmation operation performed after the parking region and the confirmation required region are displayed is received.

Embodiment 3

In addition, an operation is described in the above-described Embodiments 1 and 2 in which when the driver performs the predetermined parking operation, parking control unit 140 determines that the driver has performed two confirmations, namely the parking region confirmation and the safety confirmation of the confirmation required region, and the operation of releasing the steering wheel is described as an example of the operation for the predetermined parking. This is a control method suitable for the parking support for automatically controlling the steering for parking. In the support control for automatically controlling the steering for parking, a notification of requesting the release of the steering wheel is made at the start of the parking support control and the automatic steering is started after the release of the steering wheel is detected. Thus, by determining that the confirmation operation is made by detecting the fact that the driver has released the steering wheel in advance, the number of steps to be performed by the driver and the time required for the operation can be reduced.

The present disclosure is not limited to this, and the fact that the driver has performed a predetermined operation other than operations for parking may be determined to be a fact that the driver has performed two confirmations while reducing the time required for the operation.

For example, parking control unit 140 may determine that the results of the two confirmations have been received on the basis of the fact that the driver selects "YES" of the options such as "YES" and "NO" displayed together with the parking region of touch panel display unit 20 and the like, but with such a configuration, the driver cannot perform the confirmation operation until the option "YES" is displayed on display unit 20 together with parking region and the like even when the parking region and the like are properly estimated and the fact that there is no problem has already been confirmed. Specifically, as long as the confirmation operation is a push of the "YES" button displayed together with the parking region and the like, it is impossible to perform the advance confirmation, which is a confirmation operation performed by the driver prior to the display of the parking region and the like.

However, parking control unit 140 may determine that the results of the two confirmations are received when the same operation as the activation operation for activating parking support apparatus 100 is performed by the driver. The activation operation for activating parking support apparatus 100 is an operation of pressing down the automatic parking switch, for example.

The automatic parking switch is a button that is pushed first when using the operation support function of the automatic parking, and, therefore, in the case where the region that requires safe confirmation in the parking region and the confirmation required region is preliminarily confirmed to have no problem, the driver can perform the confirmation operation by pushing the same button as that used for activating parking support apparatus 100 again without waiting for the display of the parking region and the like. Then, the driver need not move the fingers and can quickly perform the confirmation operation.

In addition, in the above-described Embodiments 1 and 2, when the driver presses the automatic parking switch for rejection of the parking region, rejection reception unit 170 determines that the parking region is rejected; however, in the case where the automatic parking switch is used to receive the results of the two confirmations, another button for rejecting the parking region may be provided, or an operation of strongly applying of the brake pedal and the like may be used for receiving the rejection.

As the driver who continuously uses the automatic parking function gains experience as the driver uses it, the driver will be more accustomed to the operation procedure of visually selecting the parking region having no problem and pushing the automatic parking switch after placing the vehicle on the side of the selected parking region, thus reducing the frequency of occurrence of the situation where the driver should perform the rejection operation due to mismatch between the parking region selected by parking region detection unit 150 and the parking region selected by the driver. Therefore, the button for rejecting the parking region need not necessarily be a physical button, and may be an option "NO" displayed on display unit 20. In this case, the rejection operation cannot be performed until the option "NO" is displayed, but such a disadvantage would be slight when the frequency of the rejection operation is low. In addition, as another means, it is possible to determine that the rejection operation is performed when a state where the confirmation operation is not performed has been continued for a certain period.

Other Modifications

In addition, while the above-described Embodiments 1 and 2 describe a method in which it is determined that a confirmation operation is performed when the driver performs the predetermined parking operation, and describe the operation of releasing the steering wheel as an example of the predetermined parking operation, the predetermined parking operation is not limited to the operation of releasing the steering wheel.

The above-described Embodiments 1 and 2 assume a parking support in which when the parking support function is activated with the gear position set to the drive position, the steering is automatically controlled after the confirmation operation, and when the driver manually operates the accelerator pedal, the brake pedal, and/or the gear under the instruction of the parking support function, vehicle 1 stops in the parking region. In this case, the fact that the steering wheel is released by the driver is the condition for starting the automatic control of steering, and therefore it can be said that the operation of releasing the steering wheel is suitable for a confirmation operation for instructing the start of the parking support.

However, there are various parking supports, and therefore there are various parking operations of the driver. For example, in the case where the parking support function is activated with the gear position set to the neutral and the gear operation is not an automatic operation, it is possible to adopt a control of determining that the confirmation operation is performed when the driver operates the gear. In addition, in the case of an aspect in which the parking support function is activated when the brake pedal is being applied, it is possible to adopt a control of determining that the confirmation operation is performed when the driver releases the brake pedal.

Further, in the case of an aspect of a brake holding in which the parking support function is activated when the brake pedal is applied and the braking is automatically maintained while the driver performs the operation, it is possible to adopt a control of determining that the confirmation operation is performed when the driver applies the accelerator pedal. In the case of an aspect in which the steering wheel is not an automatic steering and the driver operates the steering wheel under the instruction of the parking support function, it is possible to adopt a control of determining that the confirmation operation is performed when the driver operates the steering wheel. Naturally, the predetermined parking operation is not limited to one. It is possible to determine that the confirmation operation is performed when any of a plurality of parking operations exemplified above is performed, or it is possible to determine that the confirmation operation is performed when a combination of the plurality of operation is performed.

In addition, the control of determining that the confirmation operation is performed when the driver performs the predetermined parking operation is applicable to the case where the above-described advance confirmation is allowed, or the case where the above-described advance confirmation is not allowed. Regarding the number of times of the confirmation operations, the control of determining that the confirmation operation is performed when the driver performs the predetermined parking operation is also applicable to the case where the confirmation of the parking region and the safety confirmation of the confirmation required region are each performed one time. In this case, it is possible to adopt a control in which an operation different from the first confirmation operation is set as and second confirmation operation. For example, by determining the gear shift from neutral to drive to be the first confirmation operation and the releasing the applied brake pedal to be the second confirmation operation, the button operation required only for confirmation can be eliminated, and the first and second confirmation operations can be separately determined.

In this case, parking control unit 140 of parking support apparatus 100 determines that the parking region confirmation and the safety confirmation of the confirmation required region are performed when the driver performs the predetermined parking operation for each of the parking region confirmation and the safety confirmation of the confirmation required region before display control unit 120 performs the display on display unit 20. Then, parking control unit 140 starts the parking support control on the basis of the determination In addition, as described in Embodiment 3, the control of receiving the operation of the driver pushing the automatic parking switch as the confirmation operation may be combined with the control of separately determining the first and second confirmation operations.

As described above, the automatic parking switch is a button that is pushed first for activating parking support apparatus 100, and therefore the driver can quickly perform the second and third switch operations without moving the fingers. As such, the advance confirmation may not be allowed such that the parking support control is started by receiving the second automatic parking switch operation as the confirmation after the display of the parking region and receiving the third automatic parking switch operation as the confirmation after the display of the confirmation required region, or the advance confirmation may be allowed such that the parking support control started by receiving the operation as the confirmation even when one or both the time from the display of the parking region to the operation of the second automatic parking switch and the time from the display of the confirmation required region to the operation of the third automatic parking switch is a minus value. In each method, the driver can start the parking support control by only continuously pushing the automatic parking switch. When activating parking support apparatus 100, activation operation reception unit 110 receives the long-press as the activation operation, but when confirmation reception unit 130 receives the operation of the automatic parking switch as the confirmation, it may be a short-press. With the short-press, the repetitive pushing operation can be performed in a short time.

In addition, in the present embodiment, parking support apparatus 100 does not include display unit 20 and the like, the present disclosure is not limited to this, and display unit 20 and the like may be included.

In addition, while display control unit 120 performs the emphasized display with hatching on the parking region and the confirmation required region on display unit 20 in the present embodiment, the present disclosure is not limited to this.

For example, in the case where there is a plurality of parking regions and the case where the parking region is small, display control unit 120 may perform the display in an emphasized manner on display unit 20 so that each parking region is easy to visually recognize. In addition, in the case where there is an object in the confirmation required region (e.g., a portion in the vicinity of the boundary line between the confirmation required region and the non-interference region), the confirmation required region may be displayed in an emphasized manner on display unit 20 so that the object is easy to visually recognize.

In addition, in the present embodiment, activation operation reception unit 110, display control unit 120, confirmation reception unit 130, parking control unit 140, parking region detection unit 150, evaluation unit 160 and rejection reception unit 170 are included in one control apparatus (parking support apparatus 100), but the present disclosure is not limited to this.

For example, each or some of activation operation reception unit 110, display control unit 120, confirmation reception unit 130, parking control unit 140, parking region detection unit 150, evaluation unit 160 and rejection reception unit 170 may be separately provided.

The above-mentioned embodiments are merely examples of embodiments for implementing the present disclosure, and the technical scope of the present disclosure should not be interpreted as being limited by them. In other words, the present disclosure can be implemented in various forms without deviating from its gist or main features.

This application is entitled to and claims the benefit of Japanese Patent Application No. 2020-178176 filed on Oct. 23, 2020, the disclosure each of which including the specification, drawings and abstract is incorporated herein by reference in its entirety.

INDUSTRIAL APPLICABILITY

The parking support apparatus of the present disclosure is suitable for a parking support apparatus, a parking support method and a recording medium that can simplify the parking support operation.

The invention claimed is:

1. A parking support apparatus comprising:
a processor configured to display on a display at least one of a parking region for parking a vehicle and a confirmation required region corresponding to the parking region,
wherein the processor
receives a parking region confirmation for confirming the parking region and a confirmation required region confirmation for confirming the confirmation required region,
performs a parking support control of the vehicle when the parking region confirmation and the confirmation required region confirmation are received, and
simultaneously receives a single operation of a driver of the vehicle as the parking region confirmation and the confirmation required region confirmation,
wherein the processor includes an expert mode for simultaneously receiving the parking region confirmation and the confirmation required region confirmation, and a non-expert mode for separately receiving the parking region confirmation and the confirmation required region confirmation, and
wherein the non-expert mode and the expert mode are selectable by the processor.

2. The parking support apparatus according to claim 1, wherein the expert mode is selectable by the processor when a number of times the parking support apparatus is used is counted and the number of times is greater than a predetermined number of times.

3. The parking support apparatus according to claim 1, wherein the expert mode is selectable by the processor when a skill level determination reference time is below a predetermined value, the skill level determination reference time being set as any of a parking region confirmation time from a display of the parking region to the parking region confirmation, a confirmation required region confirmation time from a display of the confirmation required region to the confirmation required region confirmation, and a total confirmation time obtained by summing up the parking region confirmation time and the confirmation required region confirmation time.

4. The parking support apparatus according to claim 1, wherein the processor determines that the confirmation is received when the driver performs a predetermined operation for parking.

5. The parking support apparatus according to claim 4, wherein the predetermined operation for parking is any of an operation of a steering wheel of the vehicle by the driver, an operation of a brake pedal of the vehicle, an operation of an accelerator pedal of the vehicle and an operation of a gear of the vehicle.

6. The parking support apparatus according to claim 1, wherein the processor
receives an activation operation of the parking support apparatus;
receives a rejection of the parking region or the confirmation required region by the driver; and
determines that the parking region is rejected by the driver when the activation operation is received after activation of the parking support apparatus.

7. A parking support apparatus comprising:
a processor configured to display on a display at least one of a parking region for parking a vehicle and a confirmation required region corresponding to the parking region,
wherein the processor
receives a parking region confirmation for confirming the parking region and a confirmation required region confirmation for confirming the confirmation required region,
performs a parking support control of the vehicle when the parking region confirmation and the confirmation required region confirmation are received, and
simultaneously receives a single operation of a driver of the vehicle as the parking region confirmation and the confirmation required region confirmation,
wherein the processor receives the parking region confirmation even when a parking region confirmation time from a display of the parking region to the parking region confirmation is a minus value, and/or
wherein the processor receives the confirmation required region confirmation even when a confirmation required region confirmation time from a display of the confirmation required region to the confirmation required region confirmation is a minus value.

8. The parking support apparatus according to claim 7, wherein when the parking region confirmation time or the confirmation required region confirmation time is a minus value, the processor displays a screen for displaying the parking region or the confirmation required region in a manner different from a case where the parking region confirmation time or the confirmation required region confirmation time is a plus value.

9. The parking support apparatus according to claim 7, wherein
the processor
detects a candidate parking region,
evaluates the candidate parking region detected,
detects a plurality of the candidate parking regions, and
prohibits a reception of the parking region confirmation or the confirmation required region confirmation when a difference between an evaluation value of a candidate parking region having a first highest evaluation value and an evaluation value of a candidate parking region having a second highest evaluation value among the plurality of candidate parking regions provided with the evaluation value is smaller than a predetermined threshold value, and the parking region confirmation time or the confirmation required region confirmation time is a minus value.

10. A parking support method comprising:
displaying on a display at least one of a parking region for parking a vehicle and a confirmation required region corresponding to the parking region; and
starting a parking support control when a single operation of a driver of the vehicle is simultaneously received as a parking region confirmation for confirming whether there is no problem in the parking region and a confirmation required region confirmation for confirming whether the confirmation required region is safe,
wherein the parking region confirmation is effective to be received even when a parking region confirmation time from a display of the parking region to the parking region confirmation is a minus value, and/or
wherein the confirmation required region confirmation is effective to be received even when a confirmation required region confirmation time from a display of the confirmation required region to the confirmation required region confirmation is a minus value.

* * * * *